Patented Oct. 22, 1935

2,018,095

UNITED STATES PATENT OFFICE 2,018,095

PROCESS OF PREPARING SOLID DIAZONIUM SALTS

Karl Schnitzspahn, Offenbach-on-the-Main, Germany, assignor to General Aniline Works, Inc., New York, N. Y., a corporation of Delaware No Drawing. Application April 7, 1934, Serial No. 719,587. In Germany April 12, 1933

3 Claims. (Cl. 260—69)

The present invention relates to a process of preparing solid mineral acid diazonium salts from 4-halogen-2-aminodiphenylethers, the homologues and halogen-substitution products thereof.

I have found that the simple mineral acid diazonium salts from 4-halogen-2-aminodiphenylethers, their homologues and halogen-substitution products may be separated with very good yields from their aqueous, mineral acid solutions, as they are, for instance, directly obtained by diazotizing these bases, by simple addition of a mineral acid alkali salt. The solid diazonium salts thus obtained are very easily soluble in water and possess a very good stability so that they may be furnished to the dyer in the form of stable dyeing salts.

It is known that the diazo solutions of 4-halogen-2-aminodiphenylethers retain in the course of their preparation a very large excess of mineral acid (cf. German Patent No. 544,057, page 1, lines 19 et seq.) and that such mineral acid diazonium salts are very easily soluble in water. It, therefore, could not be foreseen that it would be possible to obtain stable diazosalts directly from such solutions by simple addition of a mineral acid alkali salt without neutralization of the excess of acid and to dispense with the utilization of arylsulfonic acids disclosed, for instance, in German Patents No. 484,905, No. 544,057 and No. 572,269. The present invention has the advantage over the process described in German Patent No. 545,852 that it avoids neutralization of the acid diazo solutions. Thus, in comparison with the before mentioned patents, the process of the present invention is distinguished by its simplicity and represents a considerable technical advance.

The following examples serve to illustrate the invention but they are not intended to limit it thereto; the parts are by weight:

(1) At 15° C. to 20° C. 270 parts of finely powdered sulfate of 4-chloro-2-aminodiphenylether are introduced into a solution of 130 parts of nitrosylsulfuric acid in 200 parts of sulfuric acid of 85% strength. The whole is then stirred for about 1 hour until the diazotization is finished. Thereupon, the diazotization melt strongly acid with sulfuric acid is poured upon 730 parts of ice and, to the solution thus obtained, there are added 600 parts of ammonium sulfate. Thereby, the diazonium sulfate is precipitated in a nearly quantitative yield. After stirring for a prolonged time, it is filtered from the aqueous-sulfuric acid liquid and dried at about 45° C.

4-bromo-2-aminodiphenylether may be treated in the same manner.

(2) 256 parts of the chloride of 4-chloro-2-aminodiphenylether are diazotized with 730 parts of hydrochloric acid of 10% strength by weight and 360 parts of sodium nitrite solution of 20% strength by weight. 320 parts of sodium chloride are dissolved in the filtered diazo solution. The diazonium chloride which has separated is filtered by suction at low temperature and worked up in a suitable manner. Instead of sodium chloride, there may also be used anhydrous magnesium chloride for salting out.

(3) By adding 250 parts of potassium bromide to the filtered diazo solution, obtained according to Example 2, the diazonium bromide precipitates in the form of yellow crystals which may be filtered from the solution and worked up with special precaution.

(4) 220 parts of 4-chloro-2-aminodiphenylether are diazotized with 1300 parts of nitric acid of 25% strength by weight and 360 parts of sodium nitrite solution of 20% strength by weight. From the filtered diazo solution the diazonium nitrate is precipitated by means of 500 parts of sodium nitrate in the form of yellow crystals. The product may be filtered and, preferably after dilution with suitable inorganic diluents, dried with special precaution.

Also from the hydrochloric acid diazo solution the diazonium nitrate may easily be precipitated by means of sodium nitrate.

(5) 268 parts of neutral sulfate of 4-chloro-2-aminodiphenylether are diazotized with 1000 parts of sulfuric acid of 34% strength by weight and 360 parts of sodium nitrite solution of 20% strength by weight. 450 parts of anhydrous sodium sulfate are dissolved in the filtered diazo solution. Thereby, the diazonium sulfate separates in a semisolid form with a nearly theoretical yield and soon solidifies in the form of crystals. At ordinary temperature, these crystals are filtered from the solution and worked up as usual. Instead of sodium sulfate there may also be used a sufficient quantity of ammonium sulfate or dry magnesium sulfate, for instance of the composition $MgSO_4.2H_2O$.

In a quite similar manner 4-bromo-2-aminodiphenylether may be treated.

In case the salts obtained are to be used for the manufacture of commercial diazo preparations, in order to prepare ice colors, they may be mixed with the usual diluents.

(6) 234 parts of 4-chloro-2-amino-2'-methyl-diphenylether are dissolved in 1320 parts of hot sulfuric acid of 30% strength by weight. The solution is cooled to about 20° C. Thereby, a thick magma of the sulfate of the base is obtained into which 200 parts of sodium nitrite solution of 40% strength by weight are caused to run, while cooling externally, and the whole is stirred until the diazotization is finished. The precipitation of the diazonium sulfate, which has already partly crystallized in the form of yellow needles, is completed by addition of 700 parts of ammonium sulfate or 450 parts of sodium sulfate. Then, the whole is filtered and worked up as usual.

In the same manner solid diazonium sulfate may be prepared from 4-bromo-2-amino-2'-methyldiphenyl-ether.

(7) 54 parts of the chloride of 4-chloro-2-amino - 4' - methyldiphenylether are diazotized with 220 parts of hydrochloric acid of 10% strength by weight and 75 parts of sodium nitrite solution of 20% strength by weight. The diazo solution is filtered and the diazonium chloride is salted out by addition of 80 parts of sodium chloride. The product is filtered and worked up in known manner.

Instead of separating the diazonium chloride by means of 80 parts of sodium chloride the diazonium bromide may be separated by means of 58 parts of potassium bromide. The product may be filtered and worked up with special precaution.

(8) While cooling, 47 parts of 4-chloro-2-amino-3'-methyldiphenylether are introduced into a solution of 28 parts of nitrosylsulfuric acid in 150 parts of sulfuric acid of 85% strength by weight. The melt is stirred at 20° C. to 25° C. until the diazotization is complete. Then, the melt is poured into 375 parts of ice water and the diazonium sulfate is separated by addition of 180 parts of ammonium sulfate. It is isolated from the aqueous-sulfuric acid liquid and worked up as usual.

(9) 312.5 parts of the sulfate of 2-amino-4-chloro-5-methyldiphenylether are stirred with 900 parts of sulfuric acid of 30% strength by weight at 20° C. and, then, 200 parts of sodium nitrite solution of 40% strength by weight are added. The diazo solution obtained is filtered and the acid diazonium sulfate is precipitated by means of 400 parts of Glauber's salts; the product is filtered and worked up as usual.

(10) 314 parts of the chloride of 2-amino-4-chloro-5.3'-dimethyldiphenylether are stirred with 1825 parts of hydrochloric acid of 10% strength by weight and, at 20° C., 400 parts of sodium nitrite solution of 20% strength by weight are added. The diazo solution is filtered and salted out by addition of 350 parts of sodium chloride. The diazonium chloride, which precipitates as heavy oil, is isolated from the acid solution, diluted with the equal weight of sodium sulfate and dried at low temperature.

(11) 152 parts of the sulfate of 4,4'-dichloro-2-amino-diphenylether are introduced, while cooling, into a solution of 68 parts of nitrosylsulfuric acid in 140 parts of sulfuric acid of 85% strength by weight. Then, stirring is continued until the diazotization is finished and, thereupon, the clear sulfuric acid diazo solution is poured on 400 parts of ice. On addition of 250 parts of anhydrous sodium sulfate, the diazonium sulfate precipitates at first in a molten state, but solidifies after stirring for a short time with formation of crystals and may be filtered from the solution strongly acid with sulfuric acid.

In a corresponding manner the diazonium sulfate may be obtained from 4-chloro-4'-bromo-2-aminodiphenylether or from 4,2'-dihalogen-2-aminodiphenylethers.

(12) 291 parts of the chloride of 4,2'-dichloro-2-aminodiphenylether are diazotized with 730 parts of hydrochloric acid of 20% strength by weight and 380 parts of sodium nitrite solution of 20% strength by weight. To the filtered diazo solution 170 parts of sodium nitrate are added. Thereby, the diazonium nitrate precipitates with a very good yield in the form of yellow crystals. It is filtered and further treated very cautiously.

(13) 303 parts of the sulfate of 4,2'-dichloro-2-aminodiphenylether are diazotized with 1300 parts of sulfuric acid of 30% strength by weight and 380 parts of sodium nitrite solution of 20% strength by weight. The diazo solution thus obtained is filtered and 480 parts of anhydrous sodium sulfate are added. Thereby, the diazonium sulfate precipitates at first in a molten state, but solidifies after stirring for a short time with formation of crystals which are filtered from the solution and may be dried in a suitable manner.

(14) 303 parts of finely divided sulfate of 4,4'-dichloro-2-aminodiphenylether are diazotized with 2000 parts of sulphuric acid of 22% strength by weight and 190 parts of sodium nitrite solution of 40% strength by weight. The diazo solution thus obtained is filtered; in the filtered diazo solution 400 parts of anhydrous sodium sulfate are dissolved. Thereby, the diazonium sulfate separates nearly completely in the form of a heavy oil. At about 50° C., the oily diazonium sulfate is isolated from the aqueous solution, mixed with suitable diluents such as partially dehydrated aluminum- or magnesium sulfate, dried at about 50° C. and finished as usual.

The diazonium sulfate may also be separated, for instance, with 600 parts of ammonium sulfate instead of with 400 parts of sodium sulfate.

In the same manner the diazonium sulfate, for instance, of 2-amino-4-chloro-4'-bromo-diphenylether may be obtained.

(15) 295 parts of the hydrochloride of 4,4'-dichloro-2-aminodiphenylether are diazotized with 510 parts of hydrochloric acid of 18% strength by weight and 360 parts of sodium nitrite of 20% strength by weight. The diazo solution thus obtained is filtered and 100 parts of solid sodium chloride and 1500 parts of sodium chloride solution of 25% strength by weight are added. Thereby, the diazonium chloride separates in the form of a heavy oil which may be isolated from the acid sodium chloride solution and dried, advantageously after mixing with inorganic diluents such as partially dehydrated aluminium sulfate.

(16) 116 parts of the chloride of 4,2'-dichloro-2-amino-diphenylether are diazotized with 250 parts of hydrochloric acid of 15% strength by weight and 300 parts of sodium nitrite solution of 25% strength by weight. The diazo solution thus obtained is filtered and 200 parts of potassium bromide are added. Thereby, the diazonium bromide precipitates in the form of golden-yellow crystals. It may be filtered and further treated with special precaution.

(17) 290.5 parts of the chloride of 2-amino-4,5-dichlorodiphenylether are stirred with 1825 parts of hydrochloric acid of 10% strength by weight and 400 parts of sodium nitrite solution of 20% strength by weight are added at 20° C. The diazo solution obtained is filtered and salted out with 350 parts of sodium chloride. The diazonium chloride separates thereby in the form of a heavy oil which is isolated from the acid solution, diluted with the equal weight of sodium sulfate and dried at low temperature.

(18) 317 parts of the sulfate of 2-amino-4,5-dichloro-4'-methyldiphenylether are stirred with 1350 parts of sulfuric acid of 20% strength by weight and 400 parts of sodium nitrite solution of 20% strength by weight are slowly added at 20° C. The diazo solution obtained is filtered and salted out with 500 parts of sodium sulfate. The precipitated acid diazonium sulfate is finished as usual.

(19) 325 parts of the chloride of 2-amino-4-chloro-2,5'-dichloro-diphenylether are diazotized with 1100 parts of hydrochloric acid of 10% strength by weight and 360 parts of sodium nitrite solution of 20% strength by weight. 400 parts of sodium chloride are dissolved in the filtered diazonium solution. The precipitated diazonium chloride is filtered and dried at low temperature. It may be admixed with suitable inorganic diluents in the usual manner.

In the same manner there may be obtained the diazonium chlorides from 2-amino-4-chloro-2',4'-dichloro-diphenylether, 2-amino-4-chloro-2',6'-dichlorodiphenylether and 2-amino-4,5-dichloro-4'-chlorodiphenylether. The last mentioned base may be made by reducing the condensation product from 2,4,5-trichloronitrobenzene and para-chlorophenol.

(20) 288.5 parts of 4,5-dichloro-2-amino-2'-chlorodiphenylether, obtainable by reducing the condensation product from 2,4,5-trichloro-nitrobenzene and ortho-chlorophenol, are diazotized with 1500 parts of hydrochloric acid of 10% strength by weight and 360 parts of sodium nitrite solution of 20% strength by weight. 500 parts of sodium bromide are dissolved in the filtered diazonium solution. The precipitated diazonium bromide is filtered and dried at low temperature. It may be admixed with suitable inorganic diluents in the usual manner.

I claim:

1. The process which comprises causing the mineral acid diazonium salts of 4-halogen-2-aminodiphenylethers, at least one phenyl nucleus of which may be substituted by a substituent of the group consisting of methyl and halogen, to separate in solid form by addition of a mineral acid alkali salt to their aqueous mineral acid solutions.

2. The process which comprises causing the mineral acid diazonium salts of 4-halogen-2-aminodiphenylethers, at least one phenyl nucleus of which may be substituted by a substituent of the group consisting of methyl and halogen, to separate in solid form by addition of a mineral acid alkali salt to their aqueous mineral acid solutions directly obtained at the diazotization of these bases.

3. The process which comprises causing the mineral acid diazonium salts of 4-halogen-2-aminodiphenylethers, at least one phenyl nucleus of which may be substituted by a substituent of the group consisting of methyl and halogen, to separate in solid form by addition to their aqueous mineral acid solutions of an alkali salt of the mineral acid in question.

KARL SCHNITZSPAHN.